3,268,565
PROCESS FOR THE PREPARATION OF ORGANO METALLIC COMPOUNDS AND PRODUCTS RESULTING THEREFROM
Ernst Otto Fischer, Munich-Solln, and Konrad Fichtel, Starmberg, Germany, assignors to Union Carbide Corporation, a corporation of New York
No Drawing. Filed Jan. 24, 1962, Ser. No. 168,551
10 Claims. (Cl. 260—429)

Organo metallic compounds in which mono-olefins, such as ethylene, are bound as complex ligands have been studied in the past but only few types, mainly those containing platinum and metals of the first sub-group of the Periodic Table have been described. (H. Zeiss, Organo Metallic Chemistry, Reinhold Publishers, New York, 1960, p. 451 and seq.)

More recently, E. O. Fischer and H. P. Kögler described in Zeitschrift für Naturforschung, 15b (1960), 676, the preparation of stable ethylene complexes of manganese. In this process, cyclopentadienyl-manganese-tricarbonyl is reacted with ethylene under ultraviolet light and in presence of mercury, yielding cyclopentadienyl-manganese[I]-ethylene dicarbonyl as a volatile, relatively stable product.

It has now been surprisingly found that novel and useful organo metallic cationic compounds containing mono-olefins can readily be obtained by reacting mono-olefins with halogeno-carbonyls of metals belonging to the 6th and 7th sub-group of the Periodic Table or of metals such as iron, ruthenium, osmium, cobalt and nickel, said halogeno-carbonyls being characterized by 1 to 5 carbon monoxide ligands and 1 to 2 halogen atoms or pseudo-halogen residues, particularly with halogeno-carbonyls partially substituted by a cyclopentadienyl rest or an aromatic hydrocarbon, said reaction being performed using a Friedel-Crafts type catalyst.

Thus, when a mono-olefin such as ethylene for instance is reacted with a halogeno-carbonyl of iron such as cyclopentadienyl - iron - dicarbonylbromide, using anhydrous aluminium bromide as catalyst, one gets the formation of the novel cyclopentadienyl-iron-dicarbonyl-ethylene-tetrabromoaluminate characterized by the novel cyclopentadienyl-iron-dicarbonyl-ethylene cation. The reaction proceeds according to the following equation:

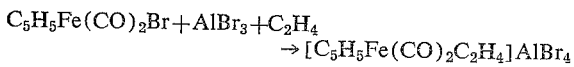
$$C_5H_5Fe(CO)_2Br + AlBr_3 + C_2H_4$$
$$\rightarrow [C_5H_5Fe(CO)_2C_2H_4]AlBr_4$$

The said novel cation can conveniently be transformed into a salt, insoluble in water but soluble in organic solvents such as cetones or alcohols, by hydrolysis and further reaction with for instance a bulky monovalent anion such as $B(C_6H_5)_4^-$, $PF_6^-$ and the like.

The halogeno-carbonyls useful for the inventive process include the derivatives of metals belonging to the 6th and 7th sub-group of the Periodic Table, e.g., chromium, molybdenum, tungsten and rhenium, or of metals selected from iron, ruthenium, osmium, cobalt and nickel, said halogeno-carbonyls being characterized by 1 to 5 carbon monoxide ligands in the molecule and 1 to 2 halogen atoms or so called pseudo-halogen residues, representatives of which are manganese pentacarbonyl bromide, rhenium pentacarbonyl chloride, iron tetracarbonyl diiodide, or salts of the mono-iodo-pentacarbonylo-chromate[I] anion or of mono-iodo-pentacarbonylo-molybdate[I] anion. Particularly suitable compounds of the above mentioned metals are those which, besides carbon monoxides and halogens also contain a substituted or unsubstituted cyclopentadienyl residue, such as cyclopentadienyl, methyl cyclopentadienyl, indenyl, a substituted or unsubstituted aromatic hydrocarbon such as benzene, toluene, xylene, mesitylene and the like. Typical representatives for such compounds are: cyclopentadienyl-chromium-tricarbonyl-chloride, cyclopentadienyl - molylbdenum - tricarbonyl - bromide, cyclopentadienyl-tungsten-tricarbonyl-chloride, benzene-manganese-tricarbonyl-chloride, cyclopentadienyl-iron-dicarbonyl-chloride, and cyclopentadienyl-nickel-monocarbonyl-iodide. Particularly stable reaction products are obtained when the metal of the starting material has a coordination number of 6, whereby it must be mentioned that a cyclopentadienyl rest or an aromatic hydrocarbon occupies three coordination places. Representatives of such compounds are for instance cyclopentadienyl-iron-dicarbonyl-halogenides, manganese-pentacarbonyl-halogenides.

Representatives of suitable mono-olefins are: the alpha olefins such as ethylene, propylene, butene(1)-isobutylene, hexene(1) or styrene, the olefins having no double bond in the alpha position such as butene(2) or cyclohexene, the substituted olefins such as vinylhalogenides, vinylethers, vinylesters, allyl halogenides and other allyl compounds, acrylic esters and other derivatives of acrylic acid, etc. It is advisable to use an excess of olefins, particularly when rather costly organo metallic compounds are used as starting material. In the event that the starting olefin shows a tendency to polymerize, it is apparent that the addition of a polymerization inhibitor might be advisable.

As mentioned previously, the inventive reaction proceeds when a Friedel-Crafts type catalyst is used. These catalysts show a tendency to increase their co-ordination number and therefore they are suitable for removing halogens from the halogeno-carbonyl compounds, hence making room for the unsaturated compounds to get in the molecule. Representatives of suitable Friedel-Crafts type catalysts are for instance anhydrous aluminium-chloride or bromide, gallium trichloride, indium chloride, boron fluoride, zinc chloride, iron chloride, titanium chloride. Friedel-Crafts type catalysts are generally used, as it is well known, in equimolar quantities. However, in the present case, it is sometimes preferable to use an excess of the said catalyst.

The inventive process is usually achieved in an inert organic solvent, e.g. a non-polar solvent such as benzene, cyclohexane, chloroform and the like, because strongly polarized solvents often show a tendency to react with a Friedel-Crafts type catalyst. In some cases, there is no need for a solvent as the olefin which is present in excess may act as reaction medium.

The reaction temperature ranges from room temperature to about 100° C. In some instances, it might be advisable to perform the reaction at lower temperature, e.g. 0° C. It is also apparent that when the olefins used as starting materials are gaseous at room temperature, it is advisable to carry out the reaction under pressure.

The novel organo metallic cationic compounds are generally insoluble in the reaction mixture and thus can readily be isolated by conventional means such as filtration. Hydrolysis with water leads to the formation of a water soluble cation which can further be precipitated by means of bulky anions such as $B(C_6H_5)_4^-$, $PF_6^-$, $Co(CO)_4^-$, $ClO_4^-$, $C_6H_2N_3O_7^-$ (picrate), $[Cr(SCN)_4(NH_3)_2]^-$ and the like, thus yielding a salt insoluble in water but soluble in polar organic solvents such as ketones and alcohols.

Thus the novel products of this invention are salts of the organo-metallic cation of general formula

$$[QM(CO)_nE_m]^+$$

wherein Q is a substituted or unsubstituted cyclopentadienyl residue, a substituted or unsubstituted aromatic hydrocarbon, M is a metal selected from chromium, molybdenum, tungsten, manganese, rhenium, iron, ruthenium, osmium, cobalt and nickel, CO represents carbon monoxide, E stands for a linear or cyclic mono-olefin as previously defined, $n$ is from 1 to 3 and $m$ is from 1 to 2; the anionic $A^-$ part of said salts is an anion selected from $AlX_4^-$, $InX_4^-$, $ZnX_3^-$, $FeX_4^-$, $TiX_5^-$ (wherein X represents a halogen), $PF_6^-$, $B(C_6H_5)_4^-$, $ClO_4^-$, $Co(CO)_4^-$, $C_6H_2N_3O_7^-$, $[Cr(SCN)_4(NH_3)_2]^-$ or any other convenient bulky anion. Typical representatives of novel products are for instance the halogeno-aluminates or phosphates of the organo-metallic cations $[C_5H_5Fe(CO)_2C_2H_4]^+$, $[C_5H_5W(CO)_3C_2H_4]^+$, $[C_5H_5Mo(CO)_3C_2H_4]^+$, $[C_5H_5Fe(CO)_2C_3H_6]^+$, $[C_5H_5Fe(CO)_2C_{18}H_{36}]^+$, $[C_5H_5Fe(CO)_2C_6H_{10}]^+$, $[C_5H_5Fe(CO)_2C_8H_{14}]^+$.

When the halogeno-carbonyls used as starting material do not include other groups than CO and halogens, it is apparent that the novel products of the invention are salts of the organo-metallic cation of general formula $$[M(CO)_nE_m]^+$$

wherein M represents a metal selected from manganese, rhenium, iron, ruthenium and osmium, CO represents carbon monoxide, E stands for a linear or cyclic mono-olefin, $n$ is from 4 to 5 and $m$ is from 1 to 2. Typical representatives of novel products of this type are for instance halogeno-aluminates and phosphates of the organo-metallic cations $[Mn(CO)_5C_2H_4]^+$, $[Re(CO)_4(C_2H_4)_2]^+$.

The novel products of this invention are further characterized by their diamagnetic properties and their infrared spectrum shows several strong absorption bands in the 2,000 cm.$^{-1}$ region, corresponding to CO valence vibrations. They are, in most cases, surprisingly stable; for instance, cyclopentadienyl-iron-dicarbonyl-ethylene-hexafluorophosphate is stable up to 160° C. and remains unchanged when stored in the air and at room temperature.

In these novel compounds, the ethylene ligand is $\pi$-bound to a cationic species and thus can readily be removed and involved in further synthesis. They can provide a metal at a low valency state in a medium, such as water, in which a metal in such a state is not readily available and hence are useful as catalysts. Since the products of this invention can readily be made soluble in organic solvents as well, it is apparent that they can also be used as a means of providing a metal at a low valency state in such a medium, and hence can be used as an improving means in the combustion of for instance alcohol containing fuels. As many other comparable organo-metallic compounds, the inventive products are also useful for the preparation of metal mirrors and coatings.

The invention will be more readily understood by reference to the folowing purely illustrative examples.

*Example I*

(a) *Preparation of the $[C_5H_5Fe(CO)_2C_2H_4]^+$ cation.*— 257 mg. (0.001 mole) of $C_5H_5Fe(CO)_2Br$, 534 mg. (0.002 mole) of anhydrous $AlBr_3$ and 10 ml. of dry benzene are placed in the glass vessel of a rotating autoclave (50 ml. capacity) in absence of air. Gaseous ethylene is then introduced under pressure (70–75 atm.) and the autoclave is then rotated for about 16 hours at 20–25° C. After removal of the ethylene excess, the glass vessel is taken off. The color of the reaction mixture has turned from deep red to yellow and the formation of a dark precipitate has taken place. The latter is separated, dried under high vacuum at room temperature, yielding a yellow-brown product which is then hydrolized with about 10 ml. of icy water leaving a yellow solution containing the organo-metallic cation $$[C_5H_5Fe(CO)_2C_2H_4]^+$$

(b) *Precipitation and purification as hexafluorophosphate.*—The above aqueous solution is filtrated and an excess of $NH_4(PF_6)$ added to it leading to the precipitation of the unsoluble $[C_5H_5Fe(CO)_2C_2H_4]PF_6$. Purification of the latter is achieved by repeating several times the following procedure: after filtration, the precipitate is dried under high vacuum at room temperature, then dissolved in 5 ml. of acetone and reprecipitated by addition of ether. The purified hexafluorophosphate is a yellow, fine crystalline powder, which decomposes at 165° C. Yield: 60%.

Analysis for $C_9H_9O_2FePF_6$ (M.W.: 350.0)—Calculated (percent): C, 30.88; H, 2.59; Fe, 15.96; P, 8.85. Found (percent): C, 30.94; H, 2.46; Fe, 15.70; P, 8.70.

Infra-red spectrum shows two bands for CO at 2,083 and 2,049 cm.$^{-1}$.

*Example II*

According to the procedure described in Example I (a) and (b), the hexafluorophosphate of $$[C_5H_5W(CO)_3C_2H_4]^+$$

cation has been prepared by reacting 369 mgr. (0.001 mole) of $C_5H_5W(CO)_3Cl$, 267 mgr. (0.002 mole) of anhydrous $AlCl_3$ in 10 ml. of dry benzene at room temperature, with excess of ethylene (75 atm.).

The purified hexafluorophosphate is a colorless, fine crystalline powder, which decomposes at 120° C. Yield: 20%.

Analysis for $C_{10}H_9O_3WPF_6$ (M.W.: 506.1)—Calculated (percent): C, 23.72; H, 1.72; W, 36.34; P, 6.12; F, 22.52. Found (percent): C, 23.90; H, 1.76; W, 33.60; P, 5.50; F, 22.70.

Infra-red spectrum shows three bands for CO at 2,105, 2,053 and 2,004 cm.$^{-1}$.

*Example III*

Using the procedure described in Example I(a) and I(b), the hexafluorophosphate of $[C_5H_5Mo(CO)_3C_2H_4]^+$ cation has been prepared by reacting 281 mgr. (0.001 mole) of $C_5H_5Mo(CO)_3Cl$, 266 mgr. (0.002 mole) anhydrous $AlCl_3$ in 10 ml. of dry benzene at room temperature with an excess of ethylene (80 atm.).

The purified hexafluorophosphate is a light yellow, fine crystalline powder which decomposes at 104° C. Yield: 24%.

Analysis for $C_{10}H_9O_3MoPF_6$ (M.W.: 418.1)—Calculated (percent): C, 28,73; H, 2.17; P, 7.41; F, 27.26. Found (percent): C, 28.65; H, 2.18; P, 6.70; F, 27.00.

Infra-red spectrum shows three bands for CO at 2,105, 2,053 and 2,006 cm.$^{-1}$.

*Example IV*

Using the procedure described in Example I(a) and (b), the hexafluorophosphate of $[C_5H_5Fe(CO)_2C_2H_4]^+$ cation has been prepared with the only difference residing in the catalyst used: 0.003 mole of $TiCl_4$, $InCl_3$, $ZnCl_2$ or $FeCl_3$ were used, the ethylene pressure being respectively 70, 62, 62 and 60 atmospheres whereas the reaction temperature was 90° C., except in the case of $FeCl_3$ where it was performed at 60° C.

Analysis and infra-red spectrum show that in every case the purified reaction product was identical with that described in Example I. The yields were respectively: 40, 53, 37 and 20%.

*Example V*

257 mgr. (0.001 mole) of $C_5H_5Fe(CO)_2Br$ were dissolved in 2–3 ml. of dry benzene and 801 mgr. (0.003 mole) of $AlBr_3$ added to it. To the mixture placed in an autoclave vessel, one poured an excess of propylene directly taken off its container and the reaction is then performed at 30° C. for 60 hours.

After removal of the gaseous propylene, the vessel is taken out the autoclave; one found that the total liquid volume increased and that a dark, rather viscous precipitate formed. This precipitate is worked up in the usual way (cf. Example I(a)) yielding an orange aqueous solution. Precipitation with NH$_4$PF$_6$ yielded, after purification, a yellow, fine crystalline powder of formula

[C$_5$H$_5$Fe(CO)$_2$C$_3$H$_6$]PF$_6$ which changed its colour at 115° C. Yield: 50%.

Analysis for C$_{10}$H$_{11}$O$_2$FePF$_6$ (P.M.: 364.0)—Calculated (percent): C, 32.99; H, 3.04; Fe, 15.34; P, 8.51; F, 31.32. Found (percent): C, 32.88; H, 3.28; Fe, 15.0; P, 8.10; F, 31.00.

*Example VI*

To 20 ml. of dry octadecylene-1 (C$_{18}$H$_{36}$), 801 mgr. (0.003 mole) of AlCl$_3$ were suspended and 257 mgr. (0.001 mole) of C$_5$H$_5$Fe(CO)$_2$Br added. This mixture was then kept under agitation for three days at room temperature. After some hours, a red oil precipitated and the solution changed its color to brown. The dark precipitate is separated out, washed with pentane and dried under vacuum for half an hour. Hydrolysis led to a red aqueous solution, which was filtrated and extracted and pentane in order to remove traces of octadecylene-1.

Precipitation with NH$_4$PF$_6$ yielded

[C$_5$H$_5$Fe(CO)$_2$C$_{18}$H$_{36}$]PF$_6$ as a rather flocculous precipitate which is further purified according to the following procedure which is repeated. The precipitate is dissolved in a small quantity of acetone, filtered, and to the filtrate one added about 50 ml. of water by small fractions. One obtained the desired product as a very fine yellow powder which is separated out using a centrifugal equipment. The purified

[C$_5$H$_5$Fe(CO)$_2$C$_{18}$H$_{36}$]PF$_6$ decomposes at 94° C. Yield: 47.5%.

Analysis for C$_{25}$H$_{41}$O$_2$FePF$_6$ (P.M.: 574.4—Calculated (percent): C, 52.27; H, 7.20; Fe, 9.72. Found (percent): C, 52.27; H, 7.18; Fe, 9.43.

*Example VII*

According to the procedure described in Example VI, one prepared [C$_5$H$_5$Fe(CO)$_2$C$_6$H$_{10}$]PF$_6$, using 20 ml. of dry cyclohexene in lieu of octadecylene-1. The reaction is completed after four hours.

Purification of the desired product is achieved by repeating the purification from acetone with ether; the purified product is obtained as yellow, bright shells which became dark at 129° C. Yield: 39%.

Analysis for C$_{13}$H$_{15}$O$_2$FePF$_6$ (P.M.: 404.1)—Calculated (percent): C, 38.64; H, 3.74; P, 7.67; F, 28.21. Found (percent): C, 38.55; H, 3.75; P, 7.43; F, 28.60.

*Example VIII*

In 20 ml. of dry cyclooctene, 257 mgr. (0.001 mole) of C$_5$H$_5$Fe(CO)$_2$Br were dissolved and 408 mgr. (0.003 mole) of anhydrous ZnCl$_2$ added. This mixture was heated at 65° C. for one hour, whereby the red colour disappeared rapidly and a red, rather viscous oil precipitated. The reaction was however pursued for about 60 hours at 40° C. under agitation.

The precipitate was worked up as in the previous example, yielding [C$_5$H$_5$Fe(CO)$_2$C$_8$H$_{14}$]PF$_6$ in 41% yield; decomposition occurs at 170° C.

Analysis for C$_{15}$H$_{19}$O$_2$FePF$_6$ (P.M.: 432.1)—Calculated (percent): C, 41.69; H, 4.43; Fe, 12.92; P, 7.17; F, 26.38. Found (percent): C, 41.7; H, 4.53; Fe, 12.76; P, 6.4; F, 26.34.

*Example IX*

According to substantially the same procedure as discussed in Example I, 550 mgr. (0.002 mole) is Mn(CO)$_5$Cl, 350 mgr. (0.002 mole) of freshly sublimed AlCl$_3$ and 7 cc. of dry cyclohexane are placed under nitrogen in the autoclave vessel and then reacted for 20 hours at 450° C. with ethylene at 140 atmospheres.

When the rotating autoclave is brought to room temperature and the excess of ethylene removed, the reaction mixture is rapidly filtered under nitrogen over a G-4 glass filter; the brownish residue is washed several times with boiling ether, then digested twice in 5–10 ml. of dimethylglycol ether, then again washed with ether and dried under vacuum. The washing ethereal solution must be dry and saturated with nitrogen. [Mn(CO)$_5$C$_2$H$_4$]AlCl$_4$ is obtained as colorless microcrystalline product which decomposes after one or two weeks even when standing under a nitrogen atmosphere. Yield: 53%.

Analysis for C$_7$H$_4$O$_5$MnAlCl$_4$ (P.M.: 391.3)—Calculated (percent): C, 21.46; H, 1.03; O, 20.42; Mn, 14.02; Al, 6.89; Cl, 36.19. Found (percent): C, 21.30; H, 1.10; O, 20.80; Mn, 13.60; Al, 7.00; Cl, 35.95.

Infra-red spectrum shows three bands for CO at 2,165, 2,083 and 2,062 cm.$^{-1}$.

*Example X*

According to the previous example, 1.6 gr. (0.004 mole) of Re(CO)$_5$Cl, 1.0 gr. (0.007 mole) of freshly sublimed AlCl$_3$ and 10 ml. of dry cyclohexane were reacted in an autoclave for 36 hours at 45° C. with ethylene under pressure (300 atm.). The reaction product was filtered under nitrogen atmosphere and then digested several times in ether, washed with 5 ml. of a mixture tetrahydrofuran/ether (1:1) and finally dried under vacuum.

Hydrolysis and precipitation of the hexafluorophosphate is achieved with 10 ml. of a concentrated aqueous solution of NH$_4$PF$_6$, the filtrating funnel is cooled by means of an external Dry Ice jacket. This precipitate is washed twice with icy water and dried under vacuum. Finally, the product is dissolved in 50 ml. of acetone, filtered and reprecipitated by ether, filtered and finally dried under vacuum, yielding 11% of [Re(CO)$_4$(C$_2$H$_4$)$_2$]PF$_6$.

Analysis for C$_8$H$_8$O$_4$RePF$_6$ (P.M.: 499.4)—Calculated (percent): C, 19.24; H, 1.61; Re, 37.30; P, 6.20. Found (percent): C, 19.30; H, 1.60; Re, 36.80; P, 6.00.

Infra-red spectrum shows three bands for CO at 2,146, 2,053 and 2,016 cm.$^{-1}$.

What we claim is:

1. The process of preparing organo-metallic compounds comprising the step of forming a salt containing an organo-metallic cation by reacting a hydrocarbon mono-olefin with a halogeno-carbonyl selected from the class consisting of the halogeno-carbonyls of a metal of the group consisting of manganese and rhenium and the cyclopentadienyl substituted halogeno-carbonyls of a metal of the group consisting of chromium, molybdenum, tungsten, iron, ruthenium, osmium, and nickel, said reaction being performed using a Friedel-Crafts type catalyst.

2. The process according to claim 1 wherein an excess of said olefin is used.

3. The process according to claim 1 wherein an excess of said catalyst is used.

4. The process according to claim 1 wherein the said reaction is performed at a temperature ranging from 20 to about 100° C.

5. The process according to claim 1 wherein the said reaction is performed in a non-polar organic solvent.

6. The process according to claim 1 wherein the said olefin is gaseous and the reaction performed under pressure.

7. The process according to claim 1 wherein the reaction product is further hydrolyzed and the resulting organo-metallic cation is precipitated by salt formation with a bulky anion selected from the group consisting of B(C$_6$H$_5$)$_4$$^-$, PF$_6$$^-$, Co(CO)$_4$$^-$, ClO$_4$$^-$, C$_6$H$_2$N$_3$O$_7$$^-$, [Cr(SCN)$_4$(NH$_3$)$_2$]$^-$ 8. As novel products the salts of the organo-metallic cations of general formula [QM(CO)$_n$E$_m$]$^+$ wherein Q represents a cyclopentadienyl residue, M represents a metal selected from the group consisting of chromium, molybdenum, tungsten, iron, ruthenium, osmium, and nickel, CO represents carbon monoxide, E represents a hydrocarbon mono-olefin, n represents a value of from 1 to 3 and $m$ represents a value of from 1 to 2, the anionic part of said salts being an anion selected from the group consisting of $AlX_4^-$, $InX_4^-$, $ZnX_3^-$, $FeX_4^-$, $TiX_5^-$, $PX_6^-$ (wherein X represents halogen), $B(C_6H_5)_4^-$, $ClO_4^-$, $Co(CO)_4^-$, $C_6H_2N_3O_7^-$ and $[Cr(SCN)_4(NH_3)_2]^-$.

9. As novel products the salts of the organo-metallic cations of general formula $[M(CO)_nE_m]^+$ wherein M represents a metal selected from the group consisting of manganese and rhenium, CO represents carbon monoxide, E represents a hydrocarbon mono-olefin, $n$ represents a value of from 4 to 5 and $m$ represents a value of from 1 to 2, the anionic part of said salts being an anion selected from the group consisting of $AlX_4^-$, $InX_4^-$, $XnX_3^-$, $FeX_4^-$, $TiX_5^-$, $PX_6^-$ (wherein X represents halogen), $B(C_6H_5)_4^-$, $ClO_4^-$, $Co(CO)_4^-$, $C_6H_2N_3O_7^-$ and $[Cr(SCN)_4(NH_3)_2]^-$.

10. As novel products, the hexafluorophosphates, tetrachloro- and tetrabromoaluminates of the cations selected from the group consisting of $[C_5H_5Fe(CO)_2C_2H_4]^+$, $[C_5H_5W(CO)_3C_2H_4]^+$, $[C_5H_5Mo(CO)_3C_2H_4]^+$, $[C_5H_5Fe(CO)_2C_3H_6]^+$, $[C_5H_5Fe(CO)_2C_{18}H_{36}]^+$, $[C_5H_5Fe(CO)_2C_6H_{10}]^+$, $[C_5H_5Fe(CO)_2C_8H_{14}]^+$, $[Mn(CO)_5C_2H_4]^+$ and $[Re(CO)_4(C_2H_4)_2]^+$.

No references cited.

TOBIAS E. LEVOW, *Primary Examiner.*

W. J. VAN BALEN, T. L. IAPALUCCI,
*Assistant Examiners.*